US012014864B2

(12) United States Patent
Warnakulasuriya

(10) Patent No.: US 12,014,864 B2
(45) Date of Patent: Jun. 18, 2024

(54) WINDING ARRANGEMENT FOR USE IN MAGNETIC DEVICES

(71) Applicant: Murata Manufacturing Co., Ltd., Nagaokakyo (JP)

(72) Inventor: Kapila Warnakulasuriya, Milton Keynes (GB)

(73) Assignee: MURATA MANUFACTURING CO., LTD., Kyoto (JP)

( * ) Notice: Subject to any disclaimer, the term of this patent is extended or adjusted under 35 U.S.C. 154(b) by 765 days.

(21) Appl. No.: 17/113,933

(22) Filed: Dec. 7, 2020

(65) Prior Publication Data

US 2021/0118607 A1 Apr. 22, 2021

Related U.S. Application Data

(63) Continuation of application No. PCT/GB2019/051602, filed on Jun. 7, 2019.

(30) Foreign Application Priority Data

Jun. 8, 2018 (GB) ...................................... 1809486

(51) Int. Cl.
*H01F 27/24* (2006.01)
*H01F 27/28* (2006.01)

(52) U.S. Cl.
CPC ......... *H01F 27/2823* (2013.01); *H01F 27/24* (2013.01)

(58) Field of Classification Search
CPC .... H01F 27/2823; H01F 27/24; H01F 27/006; H01F 27/34; H01F 41/061; H01F 41/071; H01F 30/10; H01F 27/2847; H01F 5/00; H01F 27/28
USPC .................................. 336/220, 221, 223, 83
See application file for complete search history.

(56) References Cited

U.S. PATENT DOCUMENTS 5,592,137 A * 1/1997 Levran ................ H01F 27/2866 336/195
9,362,041 B2 * 6/2016 Tomonari .............. H01F 17/045
10,559,415 B2 * 2/2020 Chuang ................... H01F 27/24
10,840,005 B2 * 11/2020 Blow .................... H01F 27/022
(Continued)

FOREIGN PATENT DOCUMENTS

CN 104505248 A * 4/2015
CN 104505248 A 4/2015
JP 2017-034125 A 2/2017

OTHER PUBLICATIONS

Official Communication issued in International Patent Application No. PCT/GB2019/051602, dated Sep. 3, 2019.

*Primary Examiner* — Shawki S Ismail
*Assistant Examiner* — Kazi S Hossain
(74) *Attorney, Agent, or Firm* — Keating & Bennett, LLP

(57) ABSTRACT

A coil of electrically conductive material includes first and second sections, the first section including a first plurality of turns and the second section including a second plurality of turns. Both the first plurality of turns and the second plurality of turns are arranged around a winding axis of the coil. The first plurality of turns are smaller than the second plurality of turns such that when viewed along the winding axis of the coil, the first plurality of turns fit within the second plurality of turns. When viewed perpendicular to the winding axis of the coil, the first and second sections are adjacent.

18 Claims, 6 Drawing Sheets

(56) References Cited

U.S. PATENT DOCUMENTS

| | | | | |
|---|---|---|---|---|
| 2008/0309445 | A1* | 12/2008 | Suzuki | H01F 41/069 336/183 |
| 2014/0104025 | A1* | 4/2014 | Honna | H01F 19/04 336/12 |
| 2015/0022301 | A1* | 1/2015 | Esaki | H01F 27/22 336/83 |
| 2019/0035552 | A1* | 1/2019 | Kainaga | H01F 27/324 |

* cited by examiner

WINDING ARRANGEMENT FOR USE IN MAGNETIC DEVICES

CROSS REFERENCE TO RELATED APPLICATIONS

This application claims the benefit of priority to United Kingdom Patent Application No. 1809486.2 filed on Jun. 8, 2018 and is a Continuation Application of PCT Application No. PCT/GB2019/051602 filed on Jun. 7, 2019. The entire contents of each application are hereby incorporated herein by reference.

BACKGROUND OF THE INVENTION

1. Field of the Invention

This application relates to a winding arrangement for use in magnetic devices, in particular, a coil of electrically conductive material for use in a magnetic device.

2. Description of the Related Art

One of the major difficulties in constructing single module high frequency power magnetics is the difficulty associated with handling high frequency currents in a compact structure. The nature of the magnetic component construction requires the conductors carrying the electrical currents to be placed in close proximity to each other. This makes it impossible to avoid one current carrying conductor getting immersed in the magnetic field of neighboring current carrying conductors. This gives the rise to the phenomenon known as the "proximity effect."

The design of modern high power high frequency converters requires handling currents such as 250 A at 20 kHz. At high frequencies and high currents, there are physical limitations to the size and geometry of conductors. For example, conductors must be sufficiently thin to mitigate the skin effect, yet wide enough to accommodate the flow of such high currents. This imposes machining challenges when manufacturing windings of conductors with such unusual aspect ratios.

Known devices have used interleaved foil windings when high frequency, high current windings are required. This has a number of machining difficulties and limits the power that can be achieved in a single unit. Larger overlapping area in this construction increases the interwinding capacitance and the amount of insulation material required. This also obstructs the flow of heat making it difficult to achieve high power densities.

We have appreciated that it would be desirable to provide a winding arrangement that addresses these issues.

SUMMARY OF THE INVENTION

According to a first aspect of the present invention, a coil of electrically conductive material for use in a magnetic device is provided. The coil includes a winding axis and a first section including a first plurality of turns arranged around the winding axis of the coil, and a second section including a second plurality of turns arranged around the winding axis of the coil. The second plurality of turns are integral with the first plurality of turns. The outer periphery of the first plurality of turns fit within the inner periphery of the second plurality of turns when viewed along the winding axis of the coil, and the first and second sections are adjacent when viewed perpendicular to the winding axis of the coil.

Optionally, the first plurality of turns and the second plurality of turns have a width in a direction perpendicular to the axis, defining the inner and outer periphery with respect to the axis of the coil.

Optionally, the electrically conductive material may include a flat wire.

Optionally, the thickness of the flat wire in the direction of the axis is less than about 1.5 mm and the width of the flat wire in the direction perpendicular to the axis of the coil is less than about 20 mm.

Optionally, the first plurality of turns enclose a first area, and the second plurality of turns enclose a second area, the second area overlapping the first area and being larger than the first area.

Optionally, each turn in the first plurality of turns is identical to each of the other first turns, and each turn in the second plurality of turns is identical to each of the other second turns.

Optionally, the shape defined by the inner periphery of the first plurality of turns is the same as the shape defined by the inner periphery of the second plurality of turns.

Optionally, the first plurality of turns is arranged helically around the winding axis of the coil, and the second plurality of turns is also arranged helically around the winding axis of the coil.

Optionally, the first plurality of turns and the second plurality of turns are concentric about the winding axis of the coil.

Optionally, the number of turns in the first plurality of turns is equal to the number of turns in the second plurality of turns.

Optionally, the shape of an area enclosed by the first plurality of turns and/or the shape of an area enclosed by the second plurality of turns is rectangular, square, or circular.

According to a second aspect of the present invention, a winding arrangement for use in magnetic devices is provided. The winding arrangement includes a first coil according to the first aspect of the present invention or any of its preferred embodiments, and a second coil according to the first aspect of the present invention or any of its preferred embodiments. The first coil and second coil are arranged coaxially such that the first section of the first coil is disposed within the second section of the second coil, and the first section of the second coil is disposed within the second section of the first coil.

Optionally, the number of turns in the first plurality of turns of the first coil is equal to the number of turns in the second plurality of turns in the second coil, and the number of turns in the first plurality of turns of the second coil is equal to the number of turns in the second plurality of turns of the first coil.

Optionally, the shape defined by the outer periphery of the first plurality of turns of the first coil is the same as the shape defined by the inner periphery of the second plurality of turns of the second coil, and the shape defined by the outer periphery of the first plurality of turns of the second coil is the same as the shape defined by the inner periphery of the second plurality of turns of the first coil.

Optionally, the first plurality of turns of the first coil fit within the second plurality of turns of the second coil, and the first plurality of turns of the second coil fit within the second plurality of turns of the first coil.

Optionally, the outer periphery of the first plurality of turns of the first coil is substantially the same distance from the winding axis of the coil as the inner periphery of the second plurality of turns of the second coil, and the outer periphery of the first plurality of turns of the second coil is substantially the same distance from the winding axis of the coil as the inner periphery of the second plurality of turns of the first axis.

According to a third aspect of the present invention, an electrical transformer is provided. The electrical transformer includes the winding arrangement of any of the twelfth to the sixteenth preferred embodiments. The windings are arranged around a transformer core.

The proposed coils and winding arrangement allow the conductors carrying current in opposite directions to be placed in close proximity to each other. This mitigates the proximity effect and therefore lowers the high frequency losses significantly. Further, this arrangement eliminates the requirement of having to form the windings of conductors with extreme aspect ratios, thus overcoming the manufacturing limitations previously associated with the manufacture of the high frequency, high current components.

As such, preferred embodiments of the present invention makes it possible to achieve high power levels at high frequencies and eliminate the manufacturing difficulties of previous constructions that mitigate high frequency losses. It further makes it possible to construct high power transformers operating at much higher frequencies than was possible with conventional constructions, and improves the heat flow between windings allowing compact designs with high power densities. It eliminates the frequency dependence of the power level that can be achieved in a single module construction and makes magnetic designs more prepared for future developments in the industry.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1B:
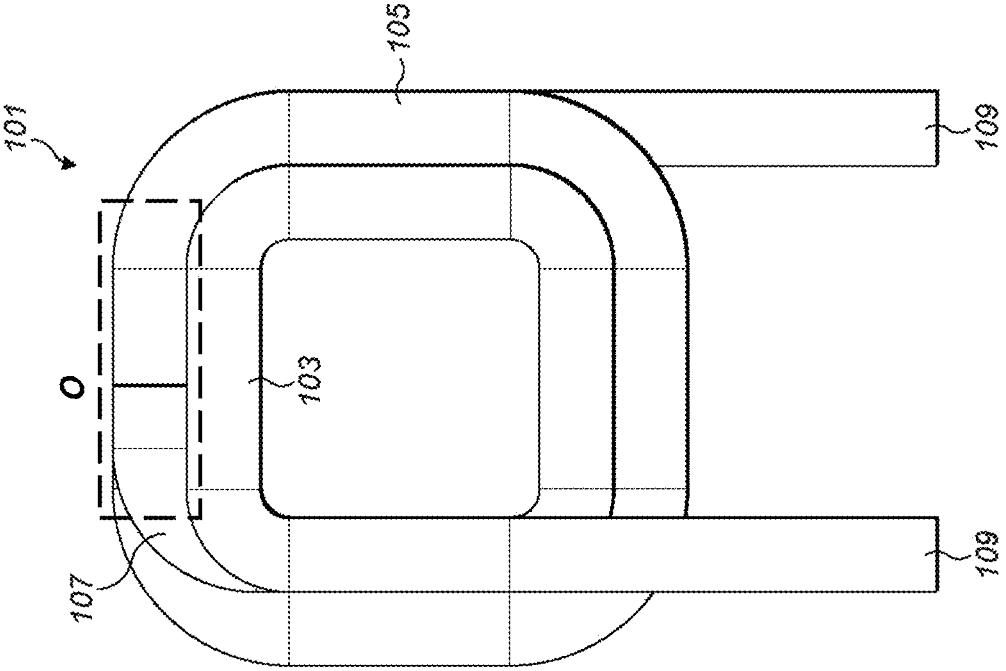
FIGS. 1*a* and 1*b* illustrate a plan view of a coil from either end of the winding axis.
Figure 1A:
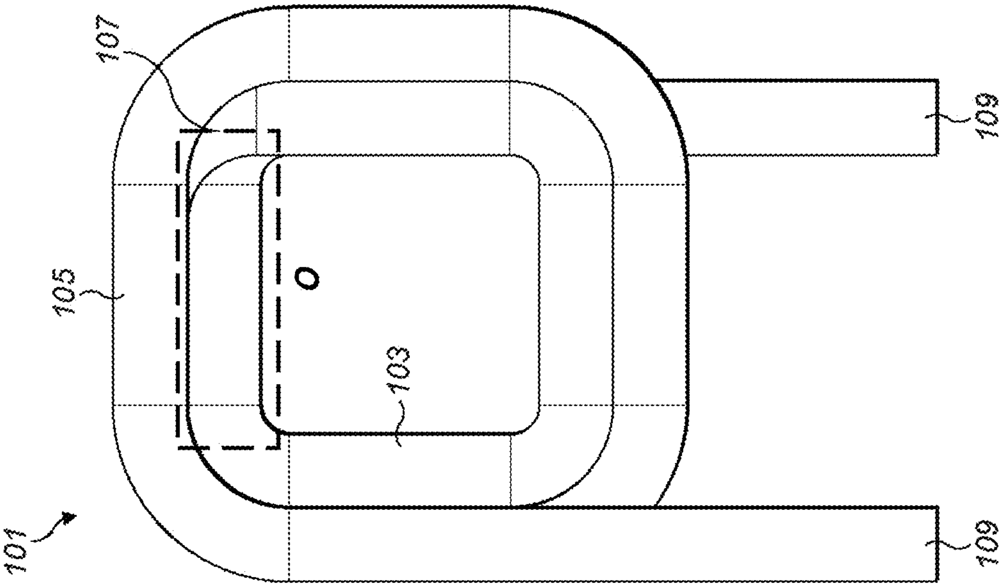

FIGS. 1*a* and 1*b* show an example of a coil 101 according to a preferred embodiment of the present invention. In FIG. 1*a*, a plan view of the coil 101 from one side is shown, and in FIG. 1*b*, a plan view of the coil 101 from the opposite side is shown. That is, the views are looking from opposite ends of the coil along its winding axis, which runs longitudinally through all of the turns of the coil.

In FIGS. 1*a* and 1*b*, an electrically conductive material is configured into the shape of a coil 101. The coil includes two main sections: a first section including a first plurality of turns 103 and a second section including a second plurality of turns 105. These two sections are integral to each other, in this case being joined by a cross-over portion 107 with an overlap O, and the coil 101 terminates at either end by connection portions 109.

The first 103 and second plurality of turns 105 are each arranged around the winding axis of the coil. In the example coil 101 of FIGS. 1*a* and 1*b*, the first 103 and second plurality of turns 105 are concentric about the winding axis of the coil. The center of the first plurality of turns 103 aligns with the center of the second plurality of turns 105 along the axis, that is, the first and second sections are coaxial. The axis of the first 103 and second plurality of turns 105 is the same as the winding axis of the coil in the present example, though this may not always be the case. In a further example, the first 103 and second plurality of turns 105 could be arranged helically around the winding axis of the coil.

Returning to the example of FIGS. 1*a* and 1*b*, the first plurality of turns 103 has an outer periphery, the outer periphery being the periphery along the edge of the electrically conductive material farthest from the axis. In other words, along the edge of the electrically conductive material opposite to the edge facing the axis.

The second plurality of turns 105 has an inner periphery, the inner periphery being the periphery along the edge of the electrically conductive material closest to the axis. In other words, along the edge of the electrically conductive material opposite to the edge facing away from the axis.

The size of the first plurality of turns 103 is smaller than the size of the second plurality of turns 105. The size difference is such that the inner periphery of the second plurality of turns 105 is larger than the outer periphery of the first plurality of turns 103, such that when viewed along the axis of the coil, as in FIGS. 1*a* and 1*b*, the first plurality of turns 103 fits within the second plurality of turns 105 without the material of the first plurality of turns 103 overlapping with the material of the second plurality of turns 105. That is, the outer periphery of the first plurality of turns 103 fits within the inner periphery of the second plurality of turns 105.

A first area is enclosed by the first plurality of turns 103 and a second area is enclosed by the second plurality of turns 105. The second area is larger than the first area due to the size of the second plurality of turns 105 being larger than the size of the first plurality of turns 103. The second enclosed area overlaps the first enclosed area when viewed down the axis.

The shape of the first area may be the same as the shape of the second area, though a different size. In the present example, the shape of the areas enclosed by the turns of both the first 103 and second plurality of turns 105 can be seen to be a square, with rounded corners. That is, the shape defined by the inner peripheries of the first 103 and second plurality of turns 105, when viewed along the axis of the coil, is a square, with rounded corners. However, other shapes could be used. For example, the shape of the turns may be rectangular, or circular, and may or may not have rounded corners.

Figure 2A:
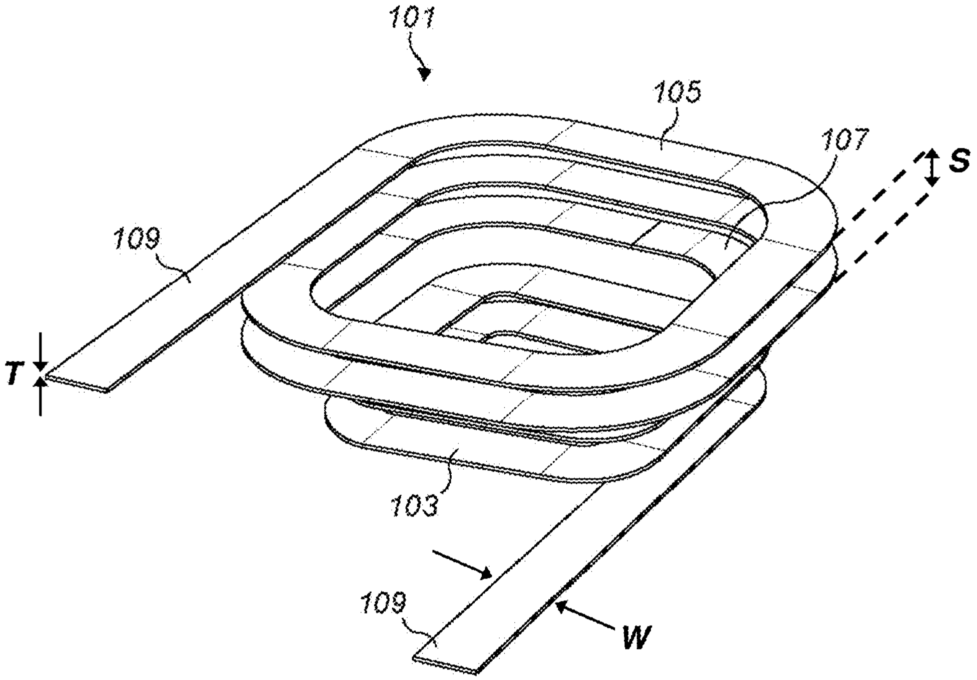
FIGS. 2*a* and 2*b* illustrate two isometric views of a coil.
Figure 2B:
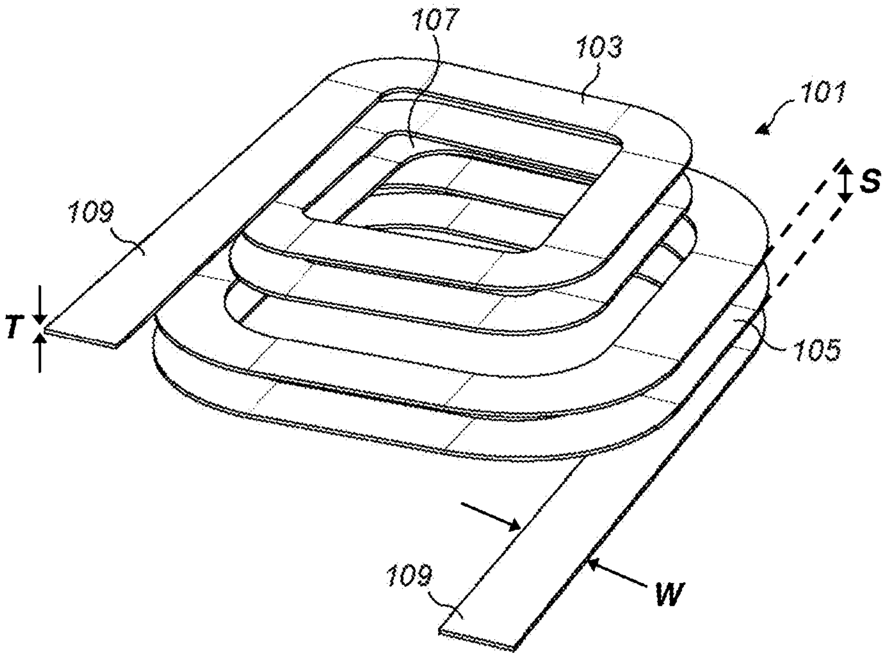

FIGS. 2*a* and 2*b* show the coil 101 in two isometric views: with the second plurality of turns 105 on top in FIG. 2*a*, and with the first plurality of turns 103 on top in FIG. 2*b*.

As can be seen in these figures, the first plurality of turns 103 are grouped together, as are the second plurality of turns 105. That is, the first section has a first plurality of turns 103 and the second section has a second plurality of turns 103, and the first section is adjacent to the second section, in particular when viewed perpendicular to the winding axis of the coil.

It can also be seen that there are an equal number of turns in the first plurality of turns 103 and the second plurality of turns 105. In the present example, the first plurality of turns 103 includes two complete turns, and the second plurality of turns 105 also includes two complete turns, though this is not limiting and more or fewer windings could be used.

Alternatively, an unequal number of turns may be used. For example, there may be more turns in the first plurality of turns 103 than in the second plurality of turns 105, or vice versa.

In the present example, each turn in the first plurality of turns 103 is identical to each of the other turns in the first plurality of turns 103, and each turn in the second plurality of turns 105 is identical to each of the other turns in the second plurality of turns 105. Adjacent turns in the first plurality of turns 103 and adjacent turns in the second plurality of turns 105 can be separated by a spacing S.

The electrically conductive material in the present example includes a flat wire, though other electrically conductive materials could be used. It can be seen that the flat wire has a small thickness T relative to its width W, where the thickness T of the wire is measured in the direction parallel to the axis of the coil, and the width W is measured in a direction perpendicular to the axis of the coil. The electrically conductive material is flat enamelled copper wire, and has a thickness T of less than about 1.5 mm and a width W of less than about 20 mm, for example. Alternatively, other electrically conductive materials, such as aluminum, may be used, along with conductive materials with other cross sections and dimensions.

A winding arrangement 111 including two coils 101*a*, 101*b*, as described above, will now be discussed with reference to FIG. 3. It is appreciated that while the winding arrangement 111 is primarily discussed with respect to the specific preferred embodiment of the coils 101*a*, 101*b*, any two coils consistent with the discussion relating to FIGS. 1*a* and 1*b*, and 2*a* and 2*b*, may be used, provided that they may be arranged as follows.

The winding arrangement includes a first coil 101*a* and a second coil 101*b*. The first coil 101*a* includes a first plurality of turns 103*a* and a second plurality of turns 105*a*. These are connected by a cross-over portion 107*a*, and the ends of the coil terminate with connection portions 109*a*. The second coil 101*b* includes a first plurality of turns 103*b* and a second plurality of turns 105*b*. These are connected by a cross-over portion 107*b*, not shown, and the ends of the coil terminate with connection portions 109*b*. The first coil 101*a* and the second coil 101*b* may be electrically isolated from one another. That is to say, an electric current cannot flow from one coil to the other coil. The first coil 101*a* and the second coil 101*b* may be magnetically coupled to each other, even if they are electrically isolated.

In the present preferred embodiment, both the first coil 101*a* and the second coil 101*b* have an equal number of turns in the first plurality of turns 103*a*, 103*b* and in the second plurality of turns 105*a*, 105*b*, namely two complete turns. However, more or fewer turns could be used.

Additionally, the number of turns in the first plurality of turns 103*a*, 103*b* and in the second plurality of turns 105*a*, 105*b* does not have to be equal. For example, the first coil 101*a* could have three turns in the first plurality of turns 103*a* and five turns in the second plurality of turns 105*a*, while the second coil 101*b* could have five turns in the first plurality of turns 103*b* and three turns in the second plurality of turns 105*b*. Advantageously, the first coil 101*a* has the same number of turns in the first plurality of turns 103*a* as the second coil 101*b* has in the second plurality of turns 105*b*, and the first coil 101*a* has the same number of turns in the second plurality of turns 105*a* as the second coil 101*b* has in the first plurality of turns 103*b*.

The first coil 101*a* and the second coil 101*b* are both arranged coaxially, with the axis of each coil 101*a*, 101*b* aligning along the axis of the winding arrangement 111. However, the first coil 101*a* is arranged the other way around relative to the second coil 101*b*. That is, the first plurality of turns of the first coil 103*a* is located at the same end of the winding arrangement 111 as the second plurality of turns of the second coil 105*b*, while the second plurality of turns of the first coil 105*a* is located at the same end of the winding arrangement 111 as the first plurality of turns of the second coil 103*b*.

In such a way, the coils 101*a*, 101*b* are arranged such that the first plurality of turns of the first coil 103*a* is disposed within the second plurality of turns of the second coil 105*b*, and the first plurality of turns of the second coil 103*a* is disposed within the second plurality of turns of the first coil 103*a*.

In preferred embodiments of the present invention, the first plurality of turns of the first coil 103*a* fit snugly within the second plurality of turns of the second coil 105*b*, and the first plurality of turns of the second coil 103*b* fit snugly in the second plurality of turns of the first coil 105*a*. That is, there is little spacing S between the turns of the two coils 101*a*, 101*b*. In other words, the outer periphery of the first plurality of turns of the first coil 103*a* is substantially the same distance from the winding axis of the coil as the inner periphery of the second plurality of turns of the second coil 105*b*, and the outer periphery of the first plurality of turns of the second coil 103*b* is substantially the same distance from the winding axis of the coil as the inner periphery of the second plurality of turns of the first axis 105*a*.

The first coil 101*a* and the second coil 101*b* cross each other to allow the coils 101*a*, 101*b* to be arranged in the manner described above to provide the winding arrangement 111.

Figure 4A:
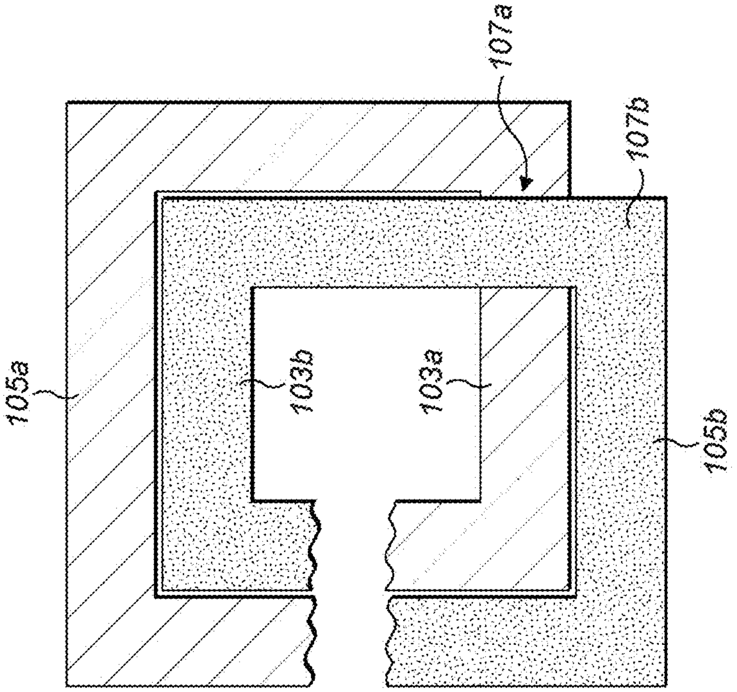
FIGS. 4*a*-4*c* illustrate the cross-over of the coils according to preferred embodiments of the present invention.
Figure 4B:
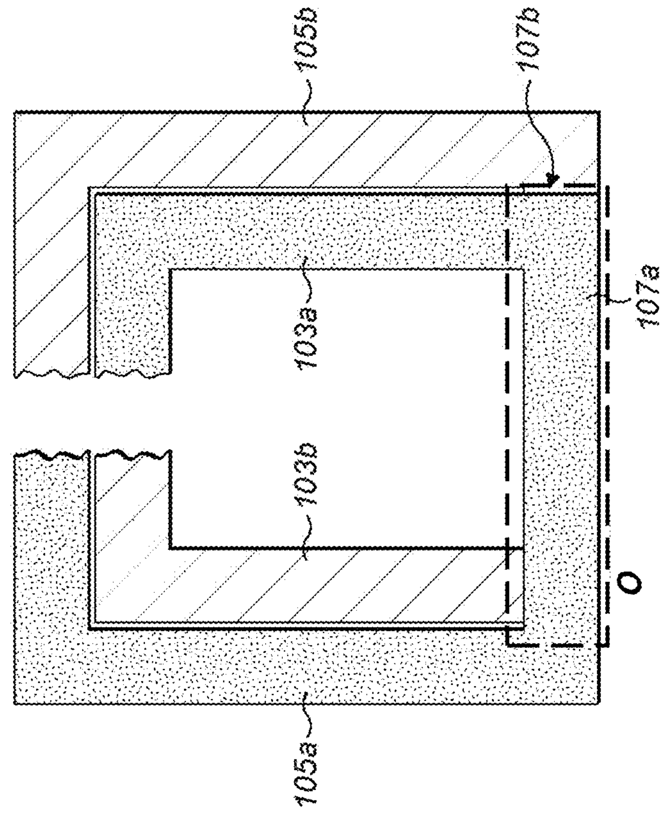
Figure 4C:
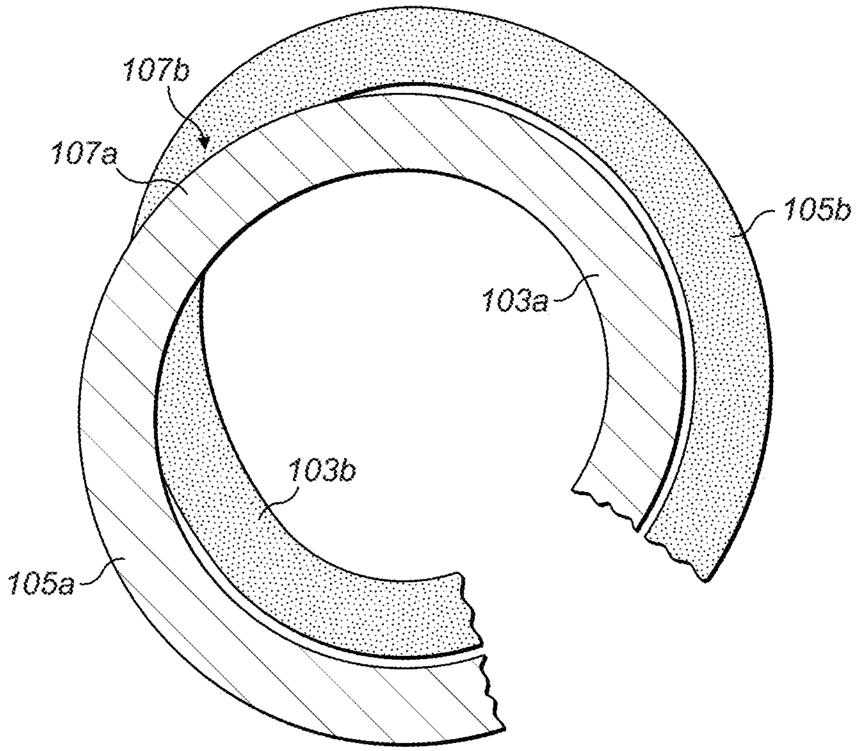

FIGS. 4*a*, 4*b* and 4*c* show details of the two coils crossing each other. FIGS. 4*a* and 4*b* show two examples by which the coils can cross for square or rectangular coils.

As shown in FIG. 4*a*, the coils cross each other via the cross-over portions 107*a*, 107*b*. The end of the first section of the first coil 103*a*, having a plurality of first turns, is shown inside the second portion of the second coil 105*b* in the lower of the diagram. These sections are connected to the cross-over sections of their respective coils 107*a*, 107*b*. The coils cross in the lower right of the figure, and the cross-over portion of the second coil 107*b* is shown as extending over the cross-over portion of the first coil 107*a*. The cross-over sections 107*a*, 107*b* are then connected to the other sections of the respective coils. That is, the cross-over section of the first coil 107*a* is connected to the second section of the first coil 105*a*, whereas the cross-over section of the second coil 107*b* is connected to the first section of the second coil 103*b*.

FIG. 4*a* shows an example with little cross over, that is the cross-over portions of the coils 107*a*, 107*b* are short, and the coils do not have much overlap. However, FIG. 4*b* shows an example with greater cross over, where the coils have an overlap O for approximately a quarter of a turn. FIG. 4*c* shows an example where the turns of the coils are circular. The principles of the cross-over portions 107*a*, 107*b* in FIGS. 4*b* and 4*c* are substantially the same as described in relation to FIG. 4*a*.

Figure 3:
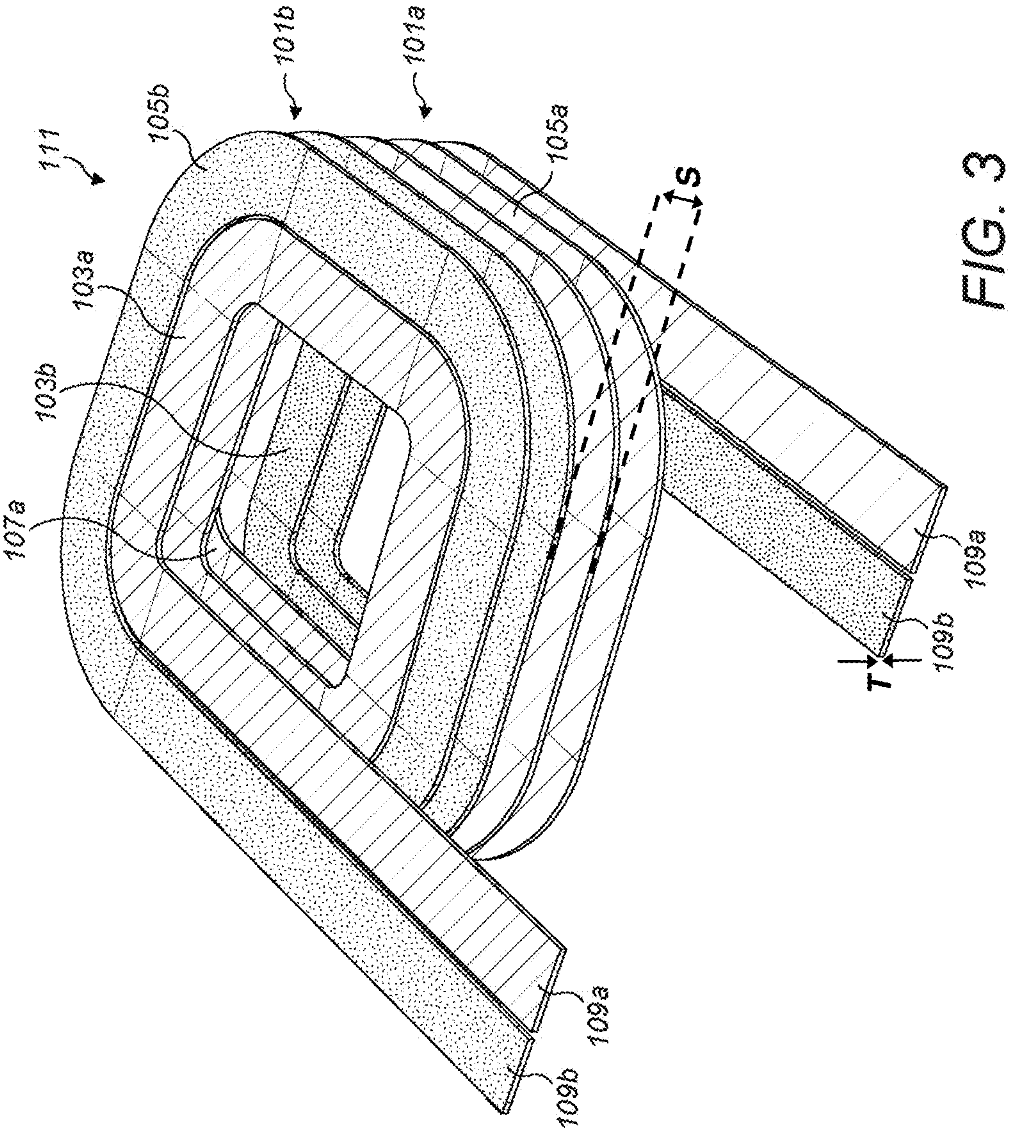
FIG. 3 illustrates a winding arrangement including two coils.
Figure 5:
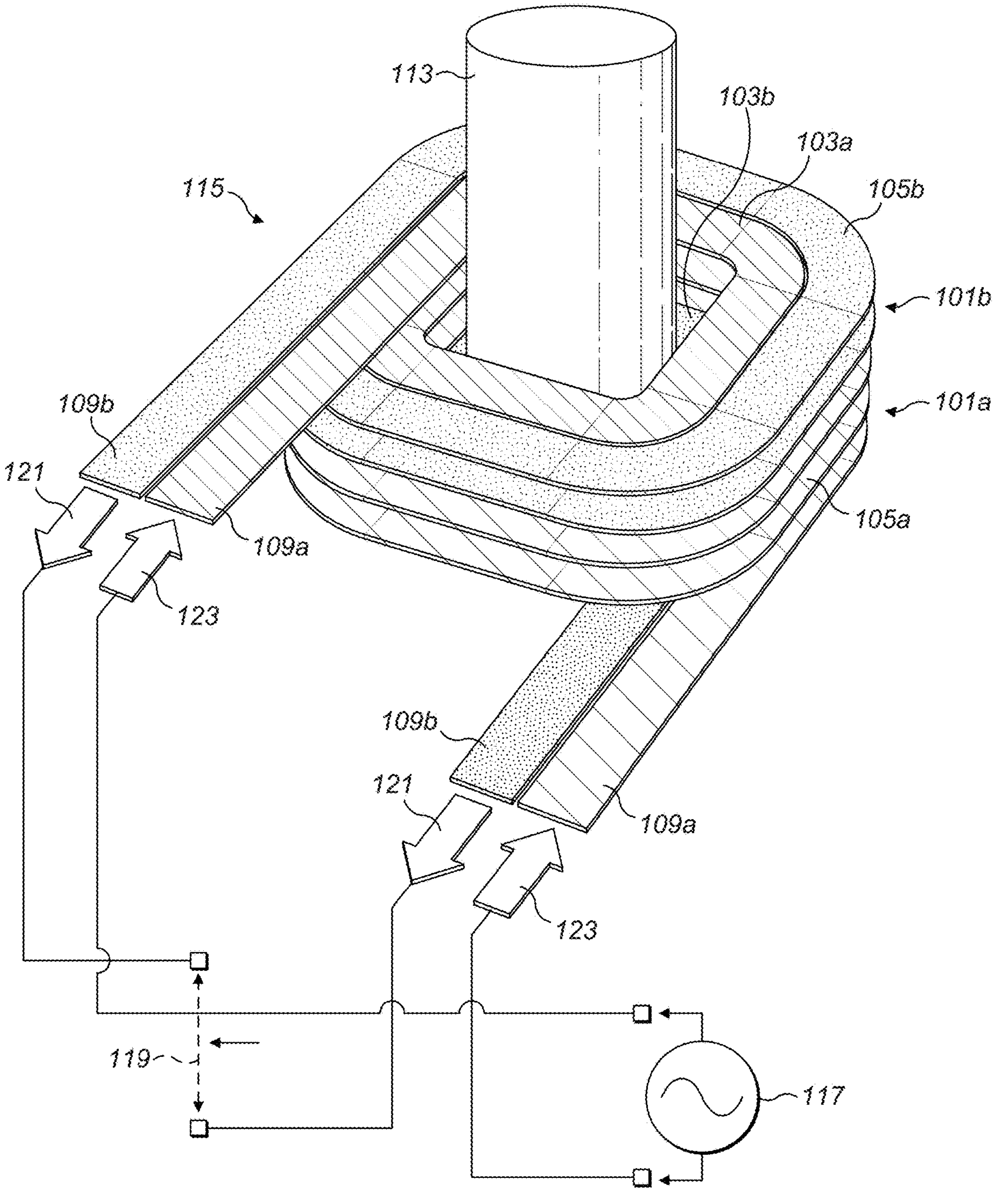
FIG. 5 illustrates an electrical transformer according to preferred embodiments of the present invention.

In another preferred embodiment of the present invention, the winding arrangement, for example that discussed in relation to FIG. 3, may be used in an electrical transformer 115. An example of such an electrical transformer 115 is shown in FIG. 5. In this transformer, the first coil 101*a* and the second coil 101*b* are electrically isolated from each other, but are magnetically coupled to each other. By connecting the connection portions of the first coil 109*a*, acting as the inputs 123, to an alternating current (AC) voltage source 117 via input terminals, an AC voltage will be produced across the connection portions of the second coil 109*b*. A load 119 may then be connected across output terminals via the outputs 121 which comprise the connection portions of the second coil 109*b*. By varying the number of turns in each coil, a step-up or step-down in voltage can be achieved.

The transformer 115 includes a transformer core 113. In the case of the present example, the core 113 is a cylindrical iron core. However, other core materials or designs may be used. In one example, the core may be an air core. Alternatively, in another example the core could be a laminated E-I type ferrous core. Such cores may improve the performance of the transformer 115. A specific core may be chosen depending upon the requirements that the transformer 115 must fulfill.

Additionally, the transformer 115 may be used individually or as a bank of connected or unconnected transformers.

In one preferred embodiment, the transformer 115 of FIG. 5 may be used in a vehicle, for example in a regenerative braking system. In this situation, the transformer may operate with the voltage source 117 being connected to an electrical generator powered by the wheels of a vehicle, and the load 119 may be a rechargeable battery pack.

Alternatively, such a transformer 115 could be used in power generation equipment, particularly in renewable energy systems. For example, it could be used to convert an output voltage from a wind turbine. In this example, the voltage source 117 may be an electrical generator powered by the rotation of the wind turbine rotors, and the load 119 may be an electrical power distribution grid. In other preferred embodiments, instead of a wind turbine, the voltage source 117 may be a wave energy converter, or a hydropower turbine.

Further applications of the present winding arrangement and transformer 115 are also contemplated. For example, the transformer 115 of FIG. 5 could be used, alone or in a transformer bank of connected or unconnected transformers, in DC-DC converters, power inverters, radio frequency electronic equipment, or in miniature scale transformers. It is noted that this list is not intended to be exhaustive, and that other applications are also contemplated.

Yet further applications of the present flat wire coil design are also contemplated. For example in a preferred example, a transformer or bank of connected or unconnected transformers may incorporate multiple flat wire coils. As a further example, the flat wire coils of two or more transformers may be inter-connected so that a resultant phase of the output or outputs of each transformer is different to the input phase.

The above and other elements, features, steps, characteristics and advantages of the present invention will become more apparent from the following detailed description of the preferred embodiments with reference to the attached drawings.

What is claimed is:

1. An electrical transformer comprising:

a winding arrangement arranged around a transformer core, the winding arrangement including:

a first coil and a second coil of electrically conductive material, each of the first coil and the second coil including a winding axis, each of the first coil and the second coil including:

a first section including a first plurality of turns arranged around the winding axis; and a second section including a second plurality of turns arranged around the winding axis, the second plurality of turns being integral with the first plurality of turns; wherein an outer periphery of the first plurality of turns fits within an inner periphery of the second plurality of turns when viewed along the winding axis, and the first and second sections being adjacent when viewed perpendicular to the winding axis;

the first coil and second coil are arranged coaxially such that the first section of the first coil is disposed within the second section of the second coil, and the first section of the second coil is disposed within the second section of the first coil;

a spacing between adjacent turns of each of the first coil and the second coil is greater than a thickness of the electrically conductive material in a direction of the winding axis; and the first coil is coupled to an input of the electrical transformer and the second coil is coupled to an output of the electrical transformer.

2. The electrical transformer of claim 1, wherein the first plurality of turns and the second plurality of turns of each of the first coil and the second coil have a width in a direction perpendicular to the winding axis, defining the inner and outer periphery with respect to the winding axis.

3. The electrical transformer of claim 2, wherein the electrically conductive material of the first coil and the second coil includes a flat wire.

4. The electrical transformer of claim 3, wherein a thickness of the flat wire of the first coil and the second coil in the direction of the winding axis is less than about 1.5 mm and a width of the flat wire in the direction perpendicular to the winding axis of the coil is less than about 20 mm.

5. The electrical transformer of claim 1, wherein the first plurality of turns of the first coil and the second coil enclose a first area, and the second plurality of turns of a same one of the first coil and the second coil enclose a second area, the second area overlapping the first area and being larger than the first area.

6. The electrical transformer of claim 1, wherein each turn in the first plurality of turns of the first coil and the second coil is identical to each of other turns of the plurality of the first turns of a respective one of the first coil and the second coil, and each turn in the second plurality of turns of the first coil and the second coil is identical to each of other turns of the plurality of second turns of a respective one of the first coil and the second coil.

7. The electrical transformer of claim 1, wherein a shape defined by the inner periphery of the first plurality of turns of the first coil and the second coil is the same as a shape defined by the inner periphery of the second plurality of turns of the same coil.

8. The electrical transformer of claim 1, wherein the first plurality of turns of the first coil and the second coil is arranged helically around the winding axis of a respective one of the first coil and the second coil, and the second plurality of turns of the first coil and the second coil is arranged helically around the winding axis of the respective one of the first coil and the second coil.

9. The electrical transformer of claim 1, wherein the first plurality of turns and the second plurality of turns of each of the first coil and the second coil are concentric about the winding axis of a respective one of the first coil and the second coil.

10. The electrical transformer of claim 1, wherein a number of turns in the first plurality of turns of the first coil and the second coil is equal to a number of turns in the second plurality of turns of a respective one of the first coil and the second coil.

11. The electrical transformer of claim 1, wherein a shape of an area enclosed by the first plurality of turns of the first coil and the second coil and/or a shape of an area enclosed by the second plurality of turns of a respective one of the first coil and the second coil is rectangular, square, or circular.

12. The electrical transformer of claim 1, wherein a number of turns in the first plurality of turns of the first coil is equal to a number of turns in the second plurality of turns in the second coil, and a number of turns in the first plurality of turns of the second coil is equal to a number of turns in the second plurality of turns of the first coil.

13. The electrical transformer of claim 1, wherein a shape defined by the outer periphery of the first plurality of turns of the first coil is the same as a shape defined by the inner periphery of the second plurality of turns of the second coil, and a shape defined by the outer periphery of the first plurality of turns of the second coil is the same as a shape defined by the inner periphery of the second plurality of turns of the first coil.

14. The electrical transformer of claim 1, wherein the first plurality of turns of the first coil fit within the second plurality of turns of the second coil, and the first plurality of turns of the second coil fit within the second plurality of turns of the first coil.

15. The electrical transformer of claim 1, wherein the outer periphery of the first plurality of turns of the first coil is substantially the same distance from the winding axis as the inner periphery of the second plurality of turns of the second coil, and the outer periphery of the first plurality of turns of the second coil is substantially the same distance from the winding axis as the inner periphery of the second plurality of turns of the first axis.

16. The electrical transformer of claim 1, wherein the first coil and second coil each include a cross-over portion that connects the first section and the second section.

17. The electrical transformer of claim 16, wherein the first coil and the second coil overlap at each cross-over portion along at least a quarter turn of the first coil and the second coil.

18. The electrical transformer of claim 16, wherein the first coil and the second coil have a rectangular shape and overlap at each cross-over portion along at least a portion of one side of the rectangular shape.

* * * * *